United States Patent [19]
Warsinski

[11] 3,891,834
[45] June 24, 1975

[54] COOLING CURVE COMPUTER
[75] Inventor: Robert Warsinski, Southfield, Mich.
[73] Assignee: Ford Motor Company, Dearborn, Mich.
[22] Filed: May 22, 1974
[21] Appl. No.: 472,395

[52] U.S. Cl. ............ 235/151.3; 73/17 R; 75/130 R; 235/151.35
[51] Int. Cl.² ................ G06F 15/20; G01N 25/02
[58] Field of Search ................... 235/151.3, 151.35; 73/17 R, 341, 359, 360, 361; 75/129, 130 R, 132; 324/103 R, 103 P, 104

[56] References Cited
UNITED STATES PATENTS

| | | | |
|---|---|---|---|
| 3,375,106 | 3/1968 | McKissick et al. | 75/130 R |
| 3,412,330 | 11/1968 | Klaver | 324/103 R |
| 3,546,921 | 12/1970 | Bourke et al. | 73/17 R |
| 3,670,558 | 6/1972 | Ryntz, Jr. et al. | 73/17 R |
| 3,703,337 | 11/1972 | Neugroschel et al. | 324/103 P X |
| 3,753,109 | 8/1973 | Schainbaum | 324/103 P |
| 3,766,772 | 10/1973 | Kern et al. | 73/17 R |
| 3,824,837 | 7/1974 | Nagaoka et al. | 73/17 R |

Primary Examiner—Malcolm A. Morrison
Assistant Examiner—Jerry Smith
Attorney, Agent, or Firm—Robert W. Brown; Keith L. Zerschling

[57] ABSTRACT

A cooling curve computer and computation process for detecting the liquidus and solidus temperatures of a poured sample of iron alloy or other metal alloy and for computing, using electrical signals representative of the magnitudes of the liquidus and solidus temperatures, the percentage or equivalent percentage of one or more constituents of the sample. The computer includes means for generating a first electrical signal proportional to the temperature of the sample as it cools. First circuit means, supplied with the first electrical signal, are provided for detecting the liquidus and solidus temperatures of the sample. Second circuit means are utilized to store the magnitudes of the first electrical signal at the times of occurrence of the liquidus and solidus temperatures in the sample. Also, third circuit means are provided for generating a second electrical signal representative of the percentage or the equivalent percentage of one or more constituents of the sample. The third circuit means utilizes the stored magnitudes of the first electrical signal in the generation of the second electrical signal.

11 Claims, 8 Drawing Figures

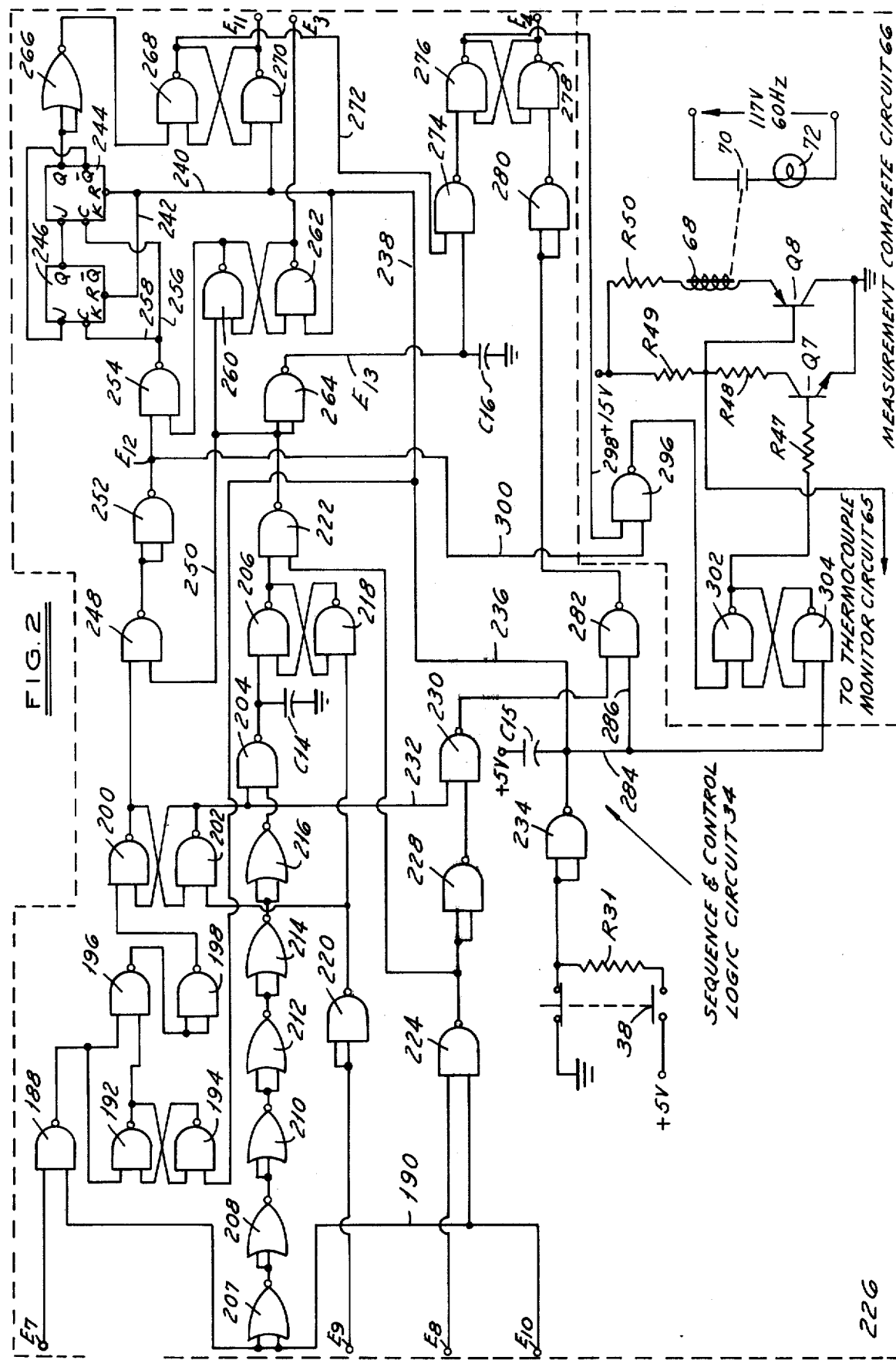

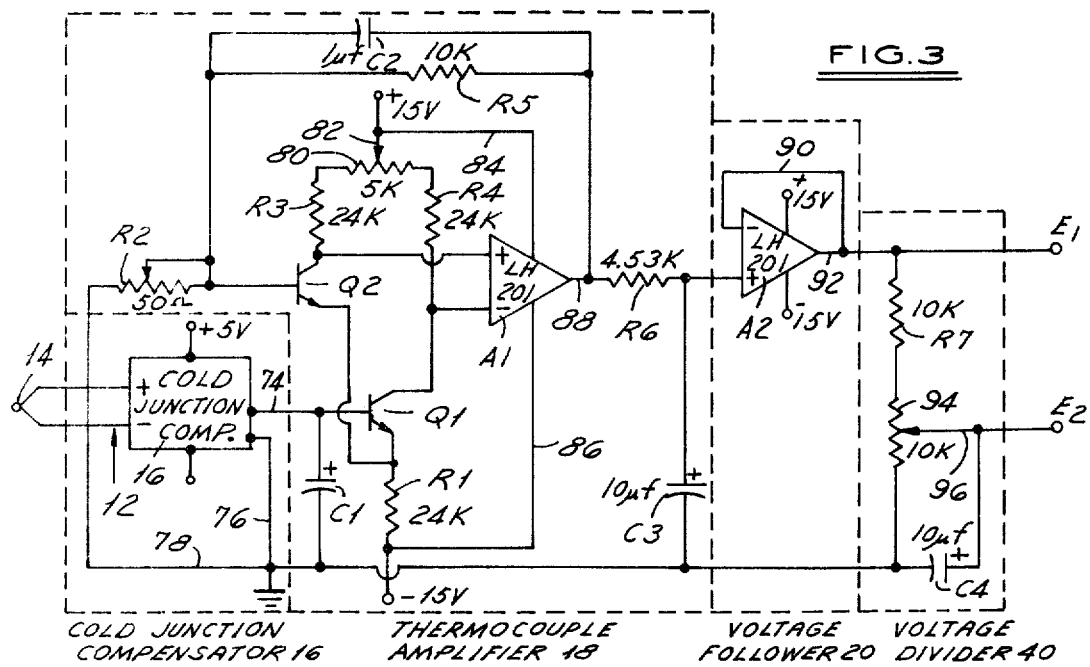
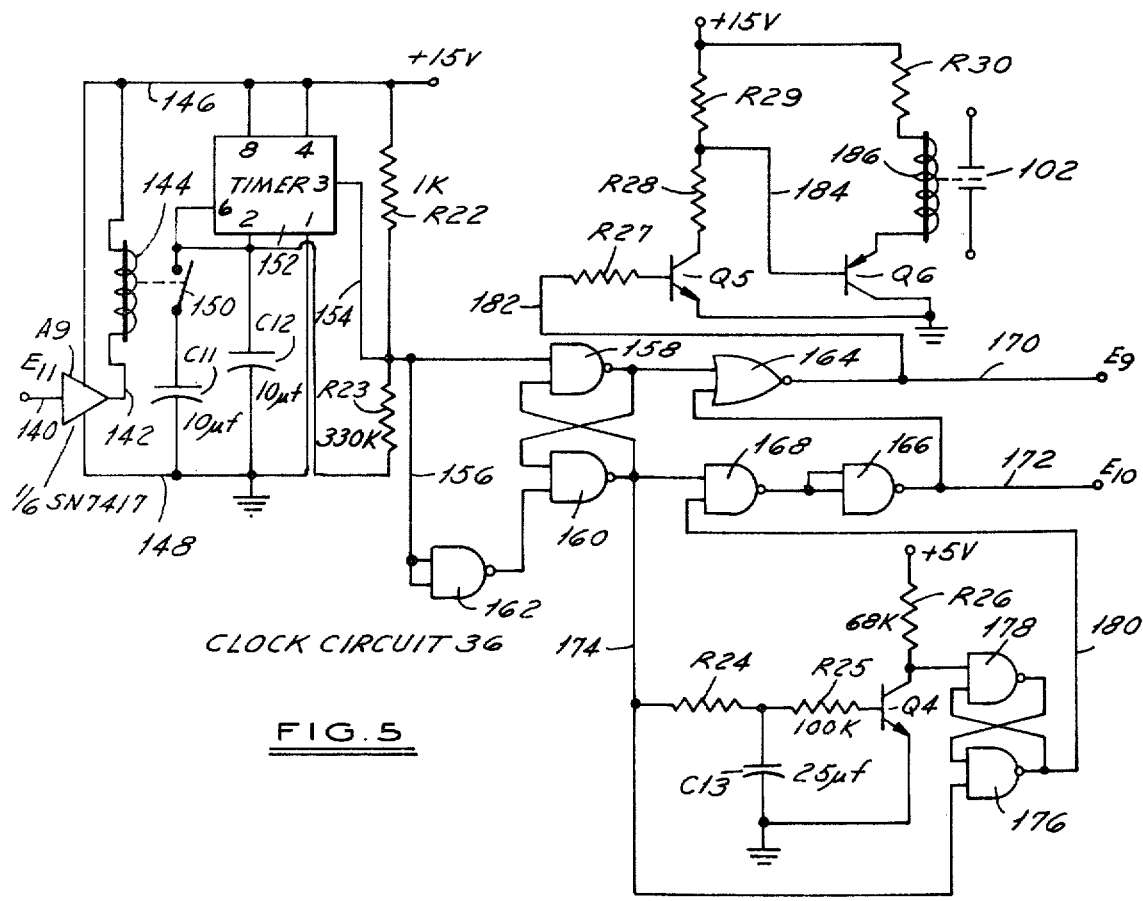

COOLING CURVE COMPUTER

BACKGROUND

This invention relates to a special purpose computer. More particularly, this invention relates to a cooling curve computer for detecting or determining the liquidus or solidus temperatures of a poured sample of iron alloy or other metal alloy and for computing, from electrical signals representative of the magnitudes of the liquidus and solidus temperatures, the percentage or equivalent percentage of one or more constituents of the alloy sample. Also, the invention relates to the process performed by the computer. In the disclosed embodiment of the invention, the cooling curve computer is utilized to determine the carbon equivalent percentage for a sample of cast iron alloy.

For purposes of this invention, the term "iron alloy" refers to an alloy of iron with carbon and to iron carbon alloys containing other constituents such as silicon. Also, the term "liquidus" refers to the temperature at which a phase change from a liquid to a solid occurs. The term "solidus" refers to an equilibrium condition existing between the solid phase and liquid phase in a condensed system of two or more components and is the temperature at which the last of the liquid phase soidifies. Further, the term "eutectoid" refers to the temperature at which an alloy solid phase is transformed into two or more solid phases.

Others have established three empirical equations which can be used to predict the percentages of carbon equivalent (CE), silicon and carbon in hypoeutectic cast iron from the liquidus, solidus and eutectoid temperatures that occur during cooling of a sample of cast iron. The following equations are typical:

$\%CE = 0.096 - 0.0043TL + 0.0056TS$
$\%Si = -49.06 + 0.0157TS + 0.0139TE$
$\%C = \%CE - \tfrac{1}{3}\%Si$ where TL, TS and TE are the liquidus, solidus and eutectoid temperatures, respectively, expressed in °F.

Empirical equations of the type written above and devices for recording the liquidus, solidus and eutectoid temperatures of a cooling alloy sample have been used for several years. Typically, disposable sand cups, such as that described in U.S. Pat. No. 3,611,808 issued Oct. 12, 1971 to J. J. Boron et al., and expendable phase change detectors, such as is described in U.S. Reissue Patent RE 26,409 issued June 11, 1968 to R. J. Hance, in combination with chromel-alumel thermocouples, have been used in recording the phase transformation temperatures in a sample of iron alloy or other metal alloy. Typically, the temperatures sensed by the thermocouple were graphically recorded or read manually by an operator of the equipment. The percentage or equivalent percentage, such as the carbon equivalent CE, had to be calculated from the recorded or observed temperature data.

SUMMARY OF THE INVENTION

It is an object of the present invention to generate an electrical signal representative of a percentage or equivalent percentage of a constitutent of an iron alloy or other metal alloy from the cooling curve of such alloy. This and other objects of the invention are accomplished with a cooling curve computer for detecting the liquidus and solidus temperatures of a poured sample of the alloy. The cooling curve computer includes means for generating a first electrical signal proportional to the temperature of the alloy sample and first circuit means, supplied with the first electrical signal, for detecting the liquidus and solidus temperatures of the sample. Second circuit means are provided for storing the magnitudes of the first electrical signal at the times of occurrence of the liquidus and solidus temperatures. Third circuit means are provided for generating a second electrical signal representative of the percentage or equivalent percentage of a constituent of the alloy sample. The third circuit means utilizes the stored magnitudes of the first electrical signal, these magnitudes being representative of the liquidus and solidus temperatures, in the generation of the second electrical signal.

The embodiment of the invention hereinafter described in detail is a cooling curve computer for detecting the liquidus and solidus temperatures of hypoeutectic cast iron. The computer generates an electrical signal representative of the carbon equivalent percentage of a cast iron sample. The carbon equivalent percentage, percent CE, is defined as being equal to the percent carbon in the sample plus one-third of the percent silicon in the sample. Thus, the carbon equivalent is an equivalent percentage.

If desired, a cooling curve computer may be used to store an electrical signal representative of the eutectoid temperature, as well as storing signals representative of the liquidus and solidus temperatures. From empirical equations such as those previously given and using the three stored electrical signals, the percent silicon and the percent carbon, in addition to the percent CE, can be calculated by the computer.

The invention may be better understood by reference to the detailed description which follows and to the drawings.

BRIEF DESCRIPTION OF THE DRAWINGS

FIG. 2 is a schematic electrical diagram of the sequence and control logic circuit and of the measurement complete circuit shown in block form in FIG. 1;

FIG. 3 is a schematic electrical diagram of the cold junction compensator, thermocouple amplifier, voltage follower and voltage divider circuits shown in block form in FIG. 1;

FIG. 5 is a schematic electrical diagram of the clock circuit shown in block form in FIG. 1;

DETAILED DESCRIPTION

Figure 8:
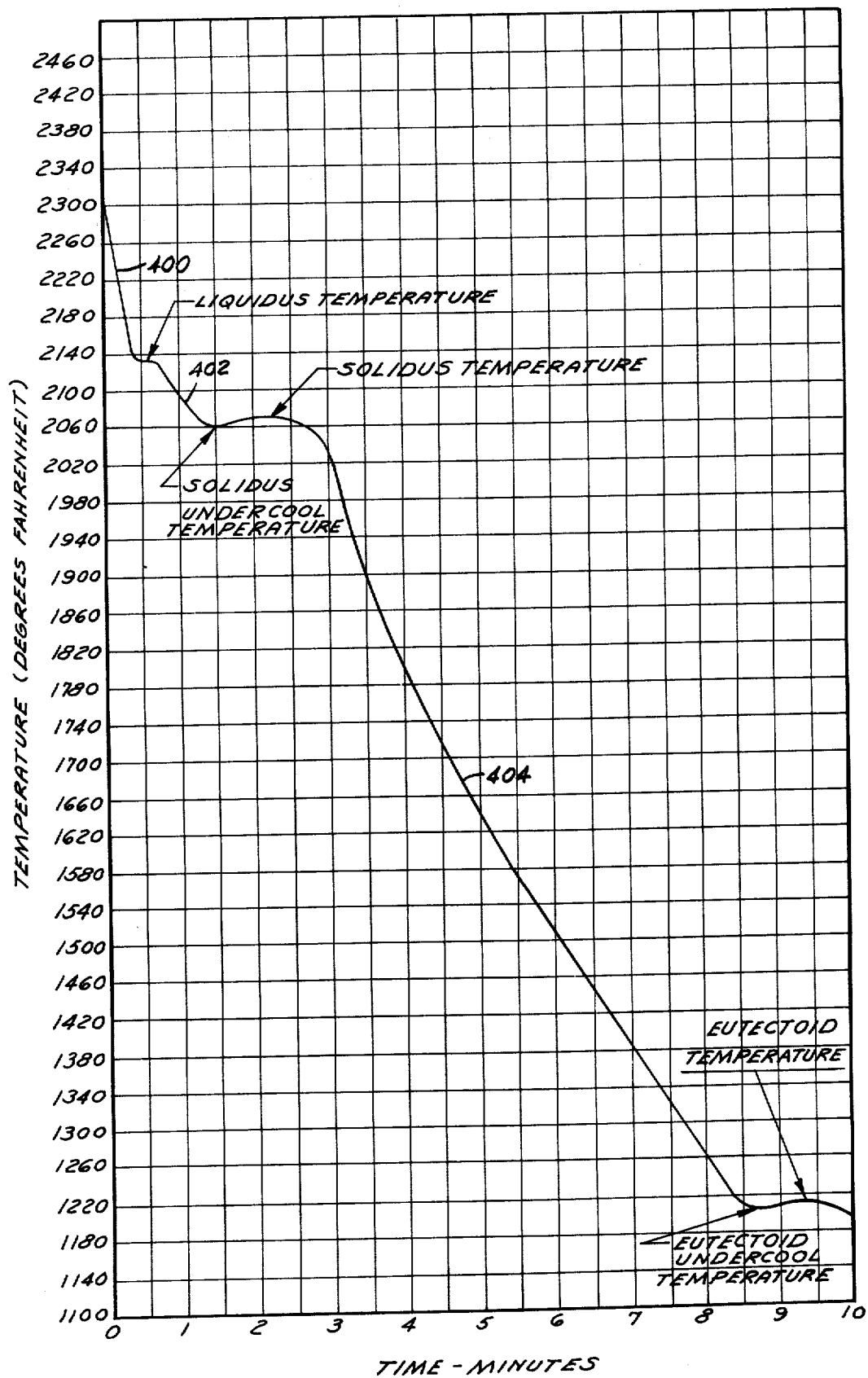
FIG. 8 is a cooling curve or graph of temperature versus time for the cooling of a hypoeutectic cast iron sample.

With reference now to the drawings, wherein like numerals refer to like parts in the several views, and with particular reference to FIG. 8, there is shown a cooling curve for a typical hypoeutectic cast iron alloy sample. The cooling curve of FIG. 8 is typical of curves obtained upon the pouring of cast iron into the liquid-metal receiving portions of the devices described in Reissue Patent RE 26,409 and U.S. Pat. No. 3,611,808. The devices described in these patents contain a thermocouple for use in generating an electrical signal proportional to the temperature of the metal sample poured into the device.

Time is plotted on the abscissa of the graph of FIG. 8. At time 0, the cast iron sample is poured into the sampling device. As time progresses, the sample cools and solidifies. In the region 400, it may be seen that the sample cools with a negative slope and a cooling rate of about 400°F per minute. At the liquidus temperature, which occurs after about one-half minute, the slope of the cooling curve becomes approximately zero. This zero slope corresponds to the liquidus temperature and is followed by the portion 402 of the cooling curve which has a negative slope and a cooling rate of about 100°F per minute, approximately one-quarter the cooling rate in the region 400.

After the sample has cooling for about one and one-half minutes, a solidus undercool temperature is reached. This undercool temperature is an inflection in the cooling curve, and the slope changes from negative to positive. The solidus temperature occurs at the next inflection point, that is, where the slope changes from positive to negative once again. The change in slope of the cooling curve at the solidus undercool temperature is the result of heat surrendered by the cooling sample as it changes completely from liquid to solid. The inflections, or, slope reversals, do not always occur. In some cases, the slope in the cooling curve at the solidus temperature will remain negative or nearly zero, but will not become positive.

The function of the cooling curve computer hereinafter described in detail is to generate an electrical signal representative of the temperature of a cooling, hypoeutectic cast iron alloy sample, to detect the magnitudes of this electrical signal or a signal proportional thereto at the times of occurrence of the liquidus and solidus temperatures, and to calculate from these magnitudes the precent CE from the first of the equations hereinabove written.

After the solidus temperature TS is reached, the iron sample continues to cool as shown by the portion 404 of the cooling curve. Eventually, the eutectoid undercool temperature is reached at which there is an inflection in the curve and a slope reversal which is followed by a second inflection point at the eutectoid temperature TE.

Figure 1:
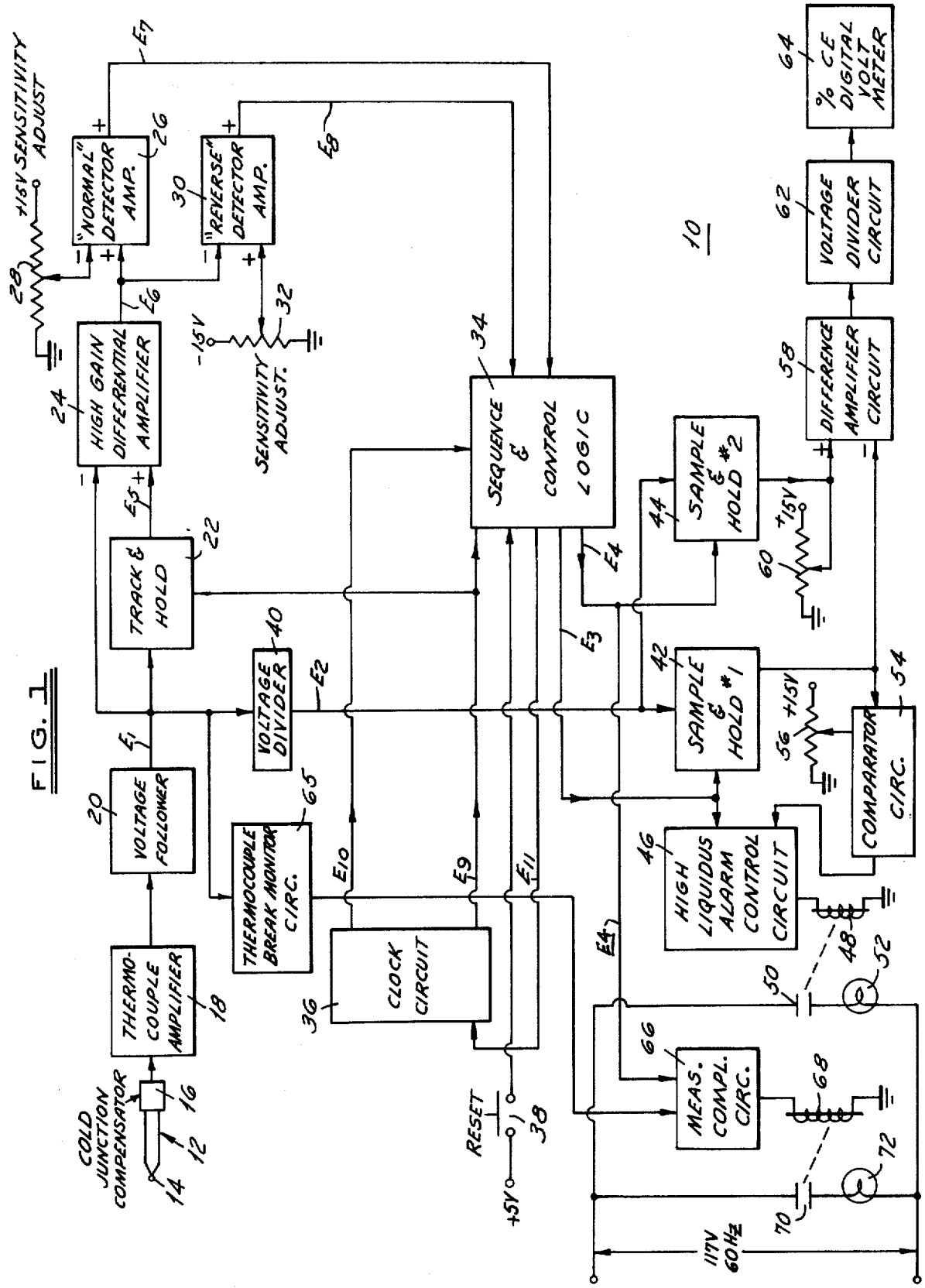
FIG. 1 is a block diagram of a cooling curve computer designed to generate an electrical signal representative of the percent CE in a hypoeutectic cast iron alloy sample.

The cooling curve computer is generally designated by the numeral 10 in FIG. 1. The computer includes a thermocouple 12 having its temperature sensing junction 14 in a position to sense the temperature of a poured sample of hypoeutectic cast iron alloy. The cold junction of the thermocouple 12 is connected to a cold junction temperature compensator 16. The output signal from the thermocouple is applied to a thermocouple amplifier 18, and the output signal from this amplifier is supplied to a voltage follower 20 to produce a voltage E1 on its output. The voltage E1 is shown in FIG. 7, as are most of the other voltage signals, designated by the capital letter E and followed by a subscript, which appear in FIG. 1 and the other drawings.

The voltage E1 is an electrical signal proportional to the temperature of the cooling iron sample. This electrical signal E1 is applied to a track and hold circuit 22 and also to the negative input of a high gain differential amplifier 24. The output of the track and hold circuit 22 is an electrical signal E5 which is applied to the positive input to the high gain differential amplifier 24. When the track and hold circuit 22 is tracking, the signal E5 is identical to the signal E1, but when this circuit 22 is holding, the signal E1 is a voltage which is decreasing relative to the held voltage signal E5 when the cooling curve FIG. 8 has the "normal" or negative slope. However, should the cooling curve pass through an inflection point and subsequently have a positive or "reverse" slope, such as occurs at the solidus undercool temperature followed by a sample temperature which increases until the solidus temperature is reached, then the signal E1 proportional to temperature rises relative to the held signal E5 at the output of the track and hold circuit 22. In such case, the high gain differential amplifier output signal E6 becomes negative.

Figure 7:
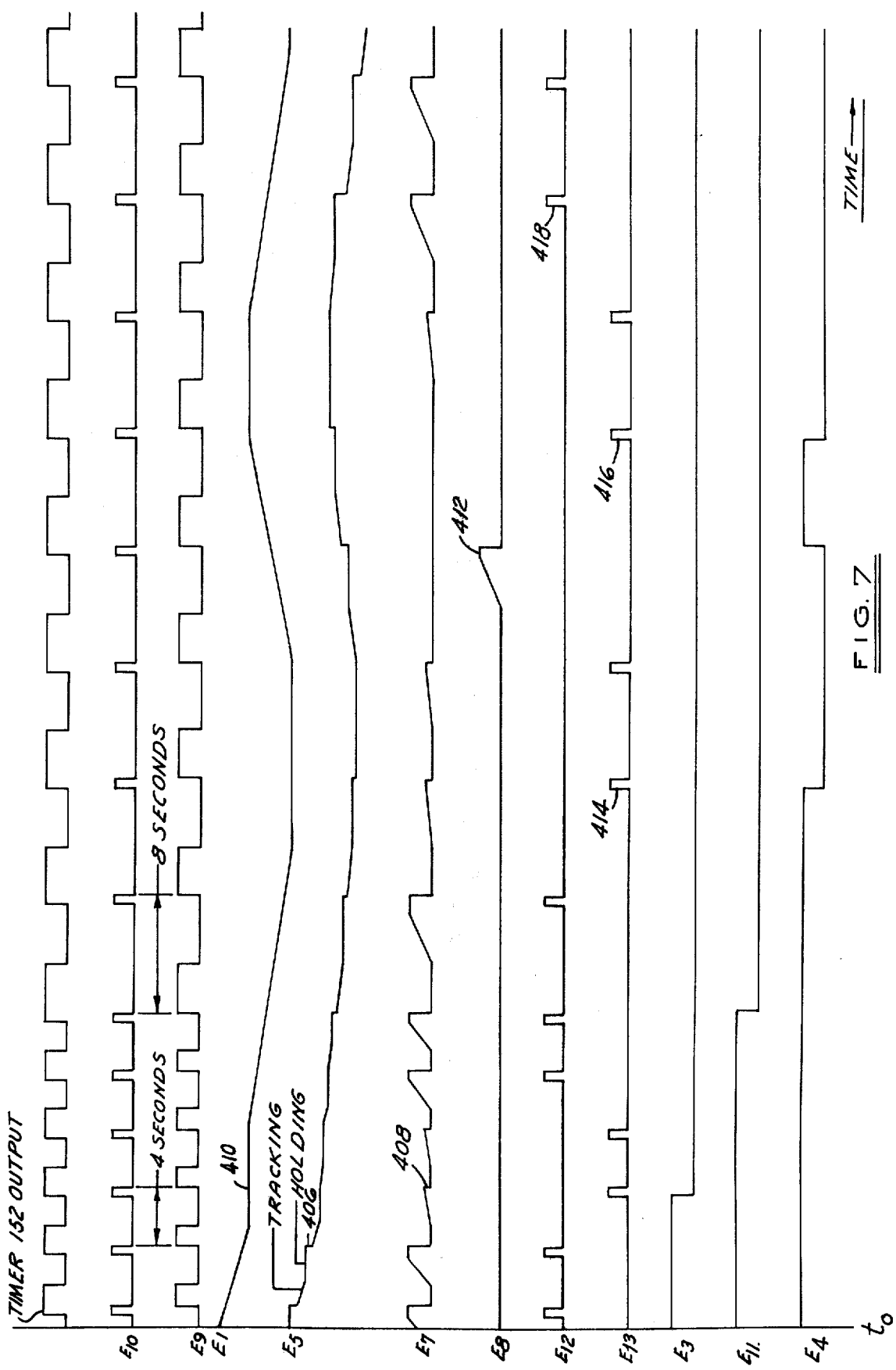
FIG. 7 is a voltage waveform drawing of 12 voltage signals which occur at various points in the computer circuitry of FIG. 1.

The signal E5 is shown in FIG. 7 and it may be seen that the signal E5 has tracking periods which follow the signal E1 and holding periods during which the signal E5 is maintained at a fixed voltage level, corresponding to the tracking voltage obtained at the instant the holding period begins. At the end of each of the holding periods, the signal E5 is at a voltage level above or below the voltage of the sample temperature signal E1 by a voltage difference which corresponds to the slope of the cooling curve during the time interval beginning with the start of the holding period and ending at the termination of the holding period. This voltage difference is designated by the numeral 406 in FIG. 7 and represents the magnitude of the maximum voltage difference applied across the input terminals of the differential amplifier 24 at the end of a given holding period.

The voltage signal E6 from the high gain differential amplifier 24 is applied to a "normal" detector amplifier 26 and also to a "reverse" detector amplifier 30. The normal detector amplifier has a potentiometer connected between a +15 volt DC supply voltage and ground. The arm of the potentiometer is one input to the normal detector amplifier. If the signal E6 is positive and exceeds the voltage on the arm of the potentiometer 28, then the normal detector amplifier 26 produces an output signal E7 which rises in a sawtooth manner to a positive voltage saturation level. The sawtooth waveform is produced at the end of each holding period of the track and hold circuit 22 if the cooling curve is decreasing in the normal manner, that is, with a negative slope.

As the iron sample cools and approaches the liquidus temperature, the negative slope decreases in magnitude and approaches a zero slope. As a result, the voltage signal E6 also decreases in magnitude and the output voltage E7 no longer reaches a saturation magnitude but rather has the magnitude shown at 408 in FIG. 7, which corresponds to the occurrence of the liquidus temperature as represented by the portion 410 of the electrical signal E1. The occurrence of the low voltage portion 408 of the signal E7 causes the magnitude of a signal E2, proportional to the signal E1, at this time to be stored by a sample and hold circuit hereinafter described.

The reverse detector amplifier 30 has its positive input connected to the arm of a potentiometer 32 which is grounded at one of its terminals and which has its opposite terminal connected to a −15 volt DC source of electrical energy. Thus, the potential on the arm of the potentiometer is negative with respect to ground and the reverse detector amplifier 30 produces a positive output voltage only when the signal E6 applied to its negative input is negative relative to the negative voltage applied to its positive input. The output voltage of the reverse detector amplifier 30 is a voltage signal E8 which is shown in FIG. 7 to be a low voltage except for a sawtooth portion 412 which occurs when the slope of the cooling curve has become positive. Thus, the reverse detector amplifier 30 produces a sawtooth voltage when the cooling curve slope is positive corresponding to a reversal of the normally decreasing temperature of the cooling curve.

The signals E7 and E8 from the normal and reverse detector amplifiers are supplied to a sequence and control logic circuit 34. This circuit 34 also receives voltage signals E9 and E10 from a clock circuit 36 and it outputs a voltage signal E11 to the clock circuit 36. The sequence and control logic circuit 34 is reset by a voltage impulse transmitted to it upon closure of a reset push-button switch 38. Also, the sequence and control logic circuit outputs a voltage signal E3, which is supplied to a first sample and hold circuit 42 and to a high-liquidus alarm-control circuit 46. The first sample and hold circuit 42 receives a signal E2, which is proportional to the temperature indicating signal E1, from a voltage divider 40.

The high-liquidus alarm-control circuit 46 controls a relay 48 having contacts 50 connected in series with an indicating lamp 52. The indicating lamp 52 and its control contacts 50 are connected across a 117 volt, 60Hz source of electrical energy.

The first sample and hold circuit 42 stores the value of the signal E2 when the voltage level of the signal E3 goes from a high level to a low level to indicate the occurrence of the liquidus temperature.

A second sample and hold circuit 44 also is provided and supplied with the signal E2 proportional to the temperature of the iron sample. The second sample and hold circuit 44 is controlled by a voltage signal E4 from the sequence and logic control circuit 34. When the voltage E4 goes from a high level to a low level, the second sample and hold circuit 44 holds or stores the magnitude of the voltage signal E2 at the instant of the change in voltage level. The second sample and hold circuit 44 is used to store the voltage level of the signal E2 which occurs at the time of occurrence of the solidus temperature.

The output of the second sample and hold circuit 44 is applied directly to the positive input of a difference amplifier circuit 58. A potentiometer 60 also has its arm connected to the positive input to this amplifier circuit, and the negative input to the amplifier circuit 58 is connected to the output of the first sample and hold circuit 42. The output of the difference amplifier circuit 58 is applied to a voltage divider 62. The output of the voltage divider is applied to a digital voltmeter 64 preferably calibrated to have a direct digital read out of the percent CE in the iron sample.

The first equation written above for percent CE is expressed in terms of liquidus temperature TL and solidus temperature TS. This equation may be rewritten in terms of the millivolt output voltage of the chromel-alumel thermocouple used to sense iron sample temperatures as follows:

$$\% \text{CE} = 4.5010 - 0.22813\ (mV_L - mV_S)$$

where $mV_L$ is the number of thermocouple millivolts corresponding to the liquidus temperature and $mV_S$ is the number of thermocouple millivolts corresponding to the solidus temperature. The amount of amplification produced by the thermocouple amplifier 18, the voltage division produced by the voltage divider 40, the value of the constant voltage supplied by the potentiometer 60 to the difference amplifier circuit 58, and the voltage divider circuit 62 may be chosen such that the above equation is solved and the voltage divider circuit 62 output signal is scaled to produce a voltage indicative directly of %CE. It should be noted that the potentiometer 60 adds a constant term to the difference between the liquidus temperature represented by the output signal from the first sample and hold circuit 42 and the solidus temperature represented by the output signal from the second sample and hold circuit 44.

The output signal E4 from the sequence and logic control circuit 34 not only causes the value of the voltage signal E2 at the solidus temperature to be stored in the second sample and hold circuit 44, but also supplies the complement E4 of the voltage signal E4 to a measurement complete circuit 66. This circuit 66 controls a relay 68 having contacts 70 connected in series with an indicating lamp 72. Upon completion of the storage of the signal E2 representing the solidus temperature in the second sample and hold circuit and the automatic display of the %CE by the digital volt meter 64, the contacts 70 close to energize the indicating lamp 72 to indicate completion of the %CE computation.

A thermocouple break monitor circuit 65 is supplied with the voltage signal E1 proportional to thermocouple temperature and is used to monitor the continuity of the thermocouple. Should the thermocouple break, the measurement complete circuit 66 receives a signal from the thermocouple break monitor circuit 65 which causes the relay 68 to be energized closing the contacts 70 and causing the indicating lamp 72 to be energized. Preferably, pushing the reset button 38 will not de-energize the indicating lamp 72 unless thermocouple continuity exists.

With reference now to FIG. 3, there is shown the cold junction compensator circuit 16, the thermocouple amplifier circuit 18, a voltage follower circuit 20 and the voltage divider circuit 40. The thermocouple 12 has its temperature sensing junction 14 positioned to sense the temperature of the cast iron sample while it cools. The millivoltage produced across the cold junction of the thermocouple is proportional to the temperature difference between the temperature sensing junction 14 and the cold junction. Thus, the cold junction must be compensated for variations in ambient temperature so that the millivoltage will be a direct indication of a particular temperature at the temperature sensing junction. Thus, a cold junction compensator 16 is provided and is powered by a +5 volt DC supply voltage. Such compensators 16 are well known to those skilled in the art and need not be described in detail. The compensator 16 has an output lead 74 on which the millivolt signal is taken with respect to the voltage on the lead 76 connected to a ground lead 78. The output lead 74 is connected to the base of a transistor Q1 which has its emitter connected through a resistor R1 to a −15 volts DC supply. A capacitor C1 is connected between the base of the transistor Q1 and the ground lead 78. These components are located in the thermocouple amplifier circuit 18 which includes an operational amplifier A1 havings its negative input connected to the collector of the transistor Q1 and its positive input connected to the collector of a transistor Q2. The transistor Q2 has its emitter connected to the emitter of the transistor Q1 and has its base connected through a variable resistor R2 to the ground lead 78. A balance potentiometer 80 has its arm 82 connected to +15 volts DC and has the opposite terminals of its resistance connected, respectively, through a resistor R3 to the collector of the transistor Q2 and through a resistor R4 to the negative input to the amplifier A1. Leads 84 and 86 provide the respective positive and negative supply voltages to the amplifier A1. The output lead 88 of the amplifier has a resistor R5 and a capacitor C2 connected between it and the base of the transistor Q2. Also, the output of the amplifier A1 is connected through a resistor R6 to the positive input of an amplifier A1 connected in a voltage follower configuration. Thus, a lead 90 connects the negative input of the amplifier A2 to its output lead 92 on which the voltage signal E1, which is proportional to the temperature at the thermocouple temperature sensing junction 14, appears.

The voltage divider 40 includes a resistor R7 and a potentiometer 94 connected in series between the E1 output lead 92 and the ground lead 78. The arm 96 of the potentiometer forms the output lead on which the signal E2 appears. This signal E2 also is proportional to the temperature at the temperature sensing junction 14, but is scaled down in value. A capacitor C4 is connected between the potentiometer arm 96 and ground lead 78 to provide smoothing or filtering of the variable voltage E2.

Figure 4:
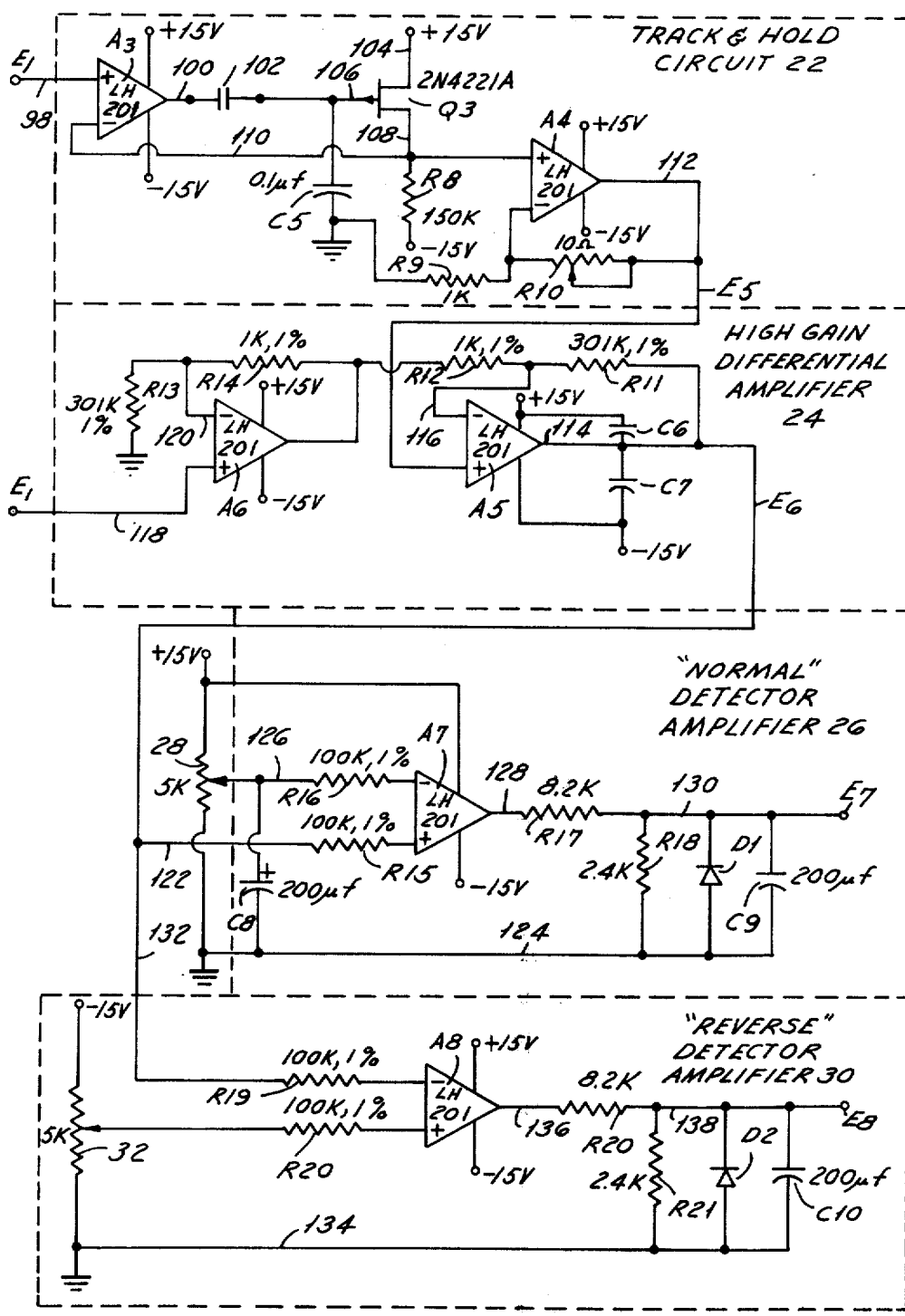
FIG. 4 is a schematic electrical diagram of the track and hold, high gain differential amplifier, "normal" detector amplifier and "reverse" detector amplifier circuits shown in block form in FIG. 1.

FIG. 4 is a detailed schematic diagram of the track and hold circuit 22, the high gain differential amplifier 24, the "normal" detector amplifier 26 and the "reverse" detector amplifier 30. The track and hold circuit 22 receives, on its input lead 98, the voltage signal E1 proportional to temperature of the iron sample. This signal E1 is applied to the positive input of an operational amplifier A3 which has its output lead 100 connected through a set of relay contacts 102 to the gate electrode 106 of a field effect transistor Q3 having its drain electrode connected to a +15 volts DC source and its source electrode 108 connected through a resistor R8 to −15 volts DC supply. A lower-leakage (polycarbonate) capacitor C5 is connected between the gate electrode 106 and ground and a lead 110 connects the source electrode 108 of the transistor Q3 to the negative input of the amplifier A3.

When the relay contacts 102 are closed, the amplifier A3 is connected as a voltage follower and the signal on its output lead follows the voltage signal E1 and charges the capacitor C5 to a corresponding voltage level. The field effect transistor Q3 has a very high input impedance and it produces a voltage on its source electrode 108 which corresponds to the voltage across the capacitor C5 and which is applied to the positive input to an operational amplifier A4. The output lead 112 of the operational amplifier A4 is connected through a variable resistor R10 to the negative input to this amplifier, and the negative input to the amplifier is connected through a resistor R9 to ground. The variable resistor R10 and the resistor R9 are connected so that amplifier A4 operates with a very high input impedance to prevent leakage from capacitor C5. Also, these resistors together provide a gain for the amplifier A4 which is adjustable between 1.00 and 1.01. This variable gain may be used to balance the high gain differential amplifier 24 which receives the voltage signal E5 appearing on the output lead 112 of the amplifier A4. It should be understood that the voltage signal E5 follows the voltage signal E1 as long as the relay contacts 102 are closed. However, when the relay contacts 102 open, the charge on the capacitor C5 is retained at the voltage level corresponding to the voltage signal E1 at the instant the relay contacts 102 open and, therefore, the output voltage signal E5 is held at the voltage level obtained by the signal E1 as of the instant the relay contacts 102 open.

The output lead 112 is connected to the positive input to an operational amplifier A5 to apply the voltage signal E5 thereto. The voltage signal E6 appears at the output lead 114 of the amplifier A5 and a feedback resistor R11 is connected between this output lead and the negative input lead 116 of the amplifier A5. Filter capacitors C6 and C7, respectively, are connected between the positive and negative voltage supply leads to the amplifier A5. Also, an input resistor R12 is connected to its negative input lead 116 and to the output of an operational amplifier A6. The amplifier A6 has a feedback resistor R14 connected between its output and its negative input lead 120 and has a resistor R13 connected between this input and ground. The voltage signal E1 proportional to iron sample temperature is applied, via a lead 118, to the positive input to the amplifier A6. As a result of the above circuit connections, the amplifier A5 amplifies the differential voltage across its input terminals to produce an output voltage signal E6 which is proportional to the difference between the voltage signals E5 and E1. When the relay contacts 102 are closed, these signals are substantially equal in magnitude and the voltage E6 is substantially equal to 0. However, when the relay contacts 102 open, the voltage signal E5 is held at a fixed value determined by the magnitude of the voltage E1 when the contacts 102 open, but the voltage E1 continues to change in value. During normal cooling of the iron sample, and with the contacts 102 open, the voltage E1 decreases while the voltage E5 is held constant. The voltage signal E6 proportional to the difference between the held value E5 and the varying voltage E1 is applied via a lead 122 and a resistor R15 to the positive input to an operational amplifier A7.

Amplifier A7 is connected in an open-loop configuration causing it to act as a slow-speed comparator. The negative input to the amplifier A7 is connected through a resistor R16 to the lead 126 of the potentiometer 28 used for sensitivity adjustment. The resistance of the potentiometer 28 is connected to a +15 volts DC at one of its terminals and to a ground lead 124 at its opposite terminal. A filter capacitor C8 is connected between the arm 126 and the ground lead 124. The output 128 of the amplifier A7 is connected to a voltage divider formed by resistors R17 and R18. The voltage signal E7 appears on the output lead 130 connected to the junction formed between resistors R17 and R18. A diode D1 and a capacitor C9 are connected in parallel between the output 130 and the ground lead 124. Diode D1 prevents any negative signal lower than one diode voltage drop below ground potential from appearing on the output lead 130. Capacitor C9 reduces the possibility of undesirable transients on the output lead 130.

During a hold period wherein the relay contacts 102 are open during a negative slope portion of the cooling curve, the voltage on the output lead 128 of the amplifier A7 gradually increases from zero volts to its maximum voltage level because the signal E6 applied to its positive input exceeds the voltage applied to its negative input from the arm 126 of the potentiometer 128. This output voltage on the lead 128 produces the sawtooth waveform shown in FIG. 7 for the voltage signal E7. The voltage signal E7 has a magnitude suitable for supply to solid-state logic devices in the sequence and control logic circuit 34. When the tracking period of the track and hold circuit resumes upon the closing of the relay contacts 102, the output voltage on the lead 128 of the amplifier A7 drops to substantially zero or slightly negative, as limited by the diode D1.

The voltage signal E6 is proportional to the slope of the cooling curve at the end of the hold time which end corresponds to the closure of the relay contacts 102. The setting of the sensitivity potentiometer 28 determines the voltage level of the signal E6, and hence the magnitude of negative slope, required to cause the voltage on the output lead 128 of the amplifier A7 and signal E7 on lead 130 to rise to a "high" logic level. Thus, if the liquidus temperature occurs, corresponding to a zero or a very low negative slope, the signal E7 is a near zero voltage level (a logic zero signal) which then signifies the occurrence of the liquidus temperature. Again, this is shown at 408 in the waveform E7 of FIG. 7 wherein it also may be seen that the normal sawtooth waveforms continue after the liquidus temperature is passed and the normal high magnitude negative slope of the cooling curve resumes such that the sample temperature continues to decrease toward the solidus temperature.

The voltage signal E6 also is applied via a lead 132 to and through a resistor R19 to the negative input to an operational amplifier A8. The positive input to this amplifier is connected through a resistor R20 to the arm of the sensitivity adjusting potentiometer 32 which has one of its resistance leads connected to a −15 volts DC supply and its opposite resistance lead connected to a ground lead 134. Thus, the arm of the potentiometer applies a fixed and adjustable voltage to the positive input to the amplifier A8. If the voltage signal E6 becomes negative, such as occurs during a positive slope portion of the cooling curve, the point may be reached where the negative voltage on the negative input to the amplifier A8 is more negative than the voltage on its positive input, thereby, causing the voltage on the output lead 136 of the amplifier A8 to increase to a high level. The output lead 136 is connected to a voltage divider formed by resistors R20 and R21. The voltage signal E8 appears on the output lead 138 connected to the junction formed between the resistors R20 and R21. Parallel connected diode D2 and capacitor C10 are connected between the lead 138 and the ground lead 134 to limit negative voltages and to reduce the possibility of transients on lead 138. The rise in potential on the amplifier output lead 136 produces the sawtooth waveform 412 shown for the voltage waveform E8 in FIG. 7.

The clock circuit 36 is shown in FIG. 5. It includes a timer 152, which preferably and as shown has the pin connections of a Signetics Corporation type NE555 timer. The timer 152 is a square wave generator having its pins 4 and 8 connected to a +15 volt DC voltage supply lead 146. Its pin 1 is connected to ground lead 148, and its pin 2 is connected through a timing control capacitor C12 to the ground lead 148. A TTL logic driver A9 has an input lead 140 on which a voltage signal E11 appears and has an output lead 142 which is connected through a relay coil 144 to the supply lead 146. The relay coil 144 controls a movable contact 150 which connects pin 6 of the timer 152 to one lead of a timing capacitor C11, the other lead of which is connected to the ground lead 148. The output of the timer 152 appears at its pin 3 and is supplied via a lead 154 to the junction formed between a resistor R22 and a resistor R23. As shown in FIG. 5, that is, with the contact 150 open, the timer 152 produces a square wave output having a period of 4 seconds. This is controlled by the capacitor C12. When the equal value capacitor C11 is placed in the timing circuit by the energization of the relay coil 144, in response to a drop of the logic voltage signal E11 from a high voltage level to a low voltage level, the contact 150 closes to place the capacitor C11 in parallel with the capacitor C12 to double the time period of the square wave output. Thus, the closure of the contact 150 causes the period of the square wave output on the lead 154 to double or increase from 4 seconds to 8 seconds.

The timer output on the lead 154 is applied to one input of a NAND-gate 158, the output of which is connected to one input of a NAND-gate 160. The output of the NAND-gate 160 is connected to the other input to the NAND-gate 158 to form a flip flop and the other input to the NAND-gate 160 is the output of a NAND-gate 162 used as an inverter and having its input connected by a lead 156 to the timer output lead 154.

The output of the NAND-gate 158 is connected to one input of a NOR-gate 164. The output of the NOR-gate 164 is obtained on a lead 170 on which the logic voltage signal E9 occurs. The other input to the NOR-gate 164 is obtained as the output of a NAND-gate 166 used as an inverter and having as an input the output of a NAND-gate 168. One input to the NAND-gate 168 is obtained as the output of the NAND-gate 160 and its other input is obtained via a lead 180 connected to a dual NAND-gate flip-flop formed by the gates 176 and 178. A lead 174 from the output of the NAND-gate 160 is connected to one input to the NAND-gate 176 and is connected through series resistors R24 and R25 to the base of a transistor Q4, the emitter of which is connected to ground and the collector of which is connected through a resistor R26 to a +5 volt DC supply. A capacitor C13 is connected between the junction formed between the resistors R24 and R25 and ground. A voltage signal E10 appears on the lead 172 at the output of the NAND-gate 166. The resistor R24 and the capacitor C13 form a time-delay circuit that causes first the signal E10 and then the signal E9 to go to a high voltage level within the same half cycle that output 154 of the timer 152 is high. These timing relationships are shown in the first three waveforms of FIG. 7.

A lead 182 connects the output lead 170, through a resistor R27, to the base of a transistor Q5 the emitter of which is connected to ground. The collector of the transistor Q5 is connected through series resistors R28 and R29 to a +15 volts DC supply voltage. The junction formed between the resistors R28 and R29 is connected by a lead 184 to the base of a transistor Q6 whose collector is connected to ground and the emitter of which is connected through a relay coil 186 and a series resistor R30 to the +15 volt DC voltage supply. The relay coil 186 controls the track and hold relay contacts 102.

The square wave output of the timer 152, which output occurs on the lead 154, is shown as the first voltage waveform in FIG. 7. The square wave timer output signal is supplied to the NAND-gates 158 and 162 to produce the voltage signals E9 and E10. These voltage signals E9 and E10 form the outputs of the clock circuit 36 and result from the interactions of the output signals produced by the NAND-gates 158, 160, 162, 166, 168, 176 and 178 and by NOR-gate 164 and the transistor Q4 with its associated circuitry. The transistor Q4 together with the capacitor C13 and the resistors R24 and R25 comprise means for determining the width of the positive pulses which form the voltage signals E9 and E10.

When the voltage signal E9 is high, a forward bias is provided for the transistor Q5 and it is rendered conductive. As a result, the lead 184 connected to the junction formed between the resistors R28 and R29 decreases in voltage level to render the PNP transistor Q6 conductive. The conduction of the transistor Q6 energizes the relay 186 and closes the relay contacts 102 located in the track and hold circuit 22. Thus, whenever the voltage signal E9 rises to its high level, the relay contacts 102 close to cause the track and hold circuit 22 to track the thermocouple voltage input signal E1. This tracking of the signal E1 continues until the voltage signal E9 from the clock circuit 36 decreases to its low level to render the transistors Q5 and Q6 nonconductive, thereby, to deenergize the relay coil 186 and open the relay contacts 102. This opening of the relay contacts 102 begins the hold period of the track and hold circuit 22.

Particular reference now is made to the sequence and logic control circuit 34 of FIG. 2. It may be seen that this circuitry receives logic-level voltage input signals E7, E8, E9 and E10 and has logic-level voltage output signals E3, E4, and E11. The voltage signal E7 is supplied to one input to a NAND-gate 188. The signal E10 is supplied via a lead 190 to the other input to this NAND-gate. The output of the NAND-gate 188 is supplied to one input to a NAND-gate 192 the output of which is connected to one input of a NAND-gate 194. The output of the NAND-gate 194 is connected to the other input to the NAND-gate 192 to form a flip-flop circuit. A NAND-gate 196 has one of its inputs connected to the output of the NAND-gate 188 and has its other input connected to the output of the NAND-gate 192. The output of the NAND-gate 196 is connected to both inputs to a NAND-gate 198, the output of which forms one input to a NAND-gate 200. The output of the NAND-gate 200 is connected to one input to a NAND-gate 202 and the output of this latter NAND-gate forms the other input to the NAND-gate 200. The output of the NAND-gate 202 also is connected to one input to a NAND-gate 204 the output of which forms one input to a NAND-gate 206.

The second input to the NAND-gate 204 is obtained from the output of series-connected NOR-gates 207, 208, 210, 212, 214 and 216. The input to the NORgate 207 is the voltage signal E10, and the series of NOR-gates forms a delay circuit for the E10 voltage pulses.

A NAND-gate 218 has its output connected to the other input to the NAND-gate 206 and the output of the NAND-gate 206 is connected to one input to the NAND-gate 218. The other input to the NAND-gate 218 is obtained as the output of a NAND-gate 220 whose input is supplied with the voltage signal E9 from the clock circuit 36. The output from the NAND-gate 206 is connected to one input of a NAND-gate 222 whose other input is obtained from the output of a NAND-gate 224.. One input to the NAND-gate 224 is connected to the lead 190 on which the voltage signal E10 from the clock circuit 36 appears and the other input to the NAND-gate 224 is the voltage signal E8, which signal is the output from the "reverse" detector amplifier 30.

The output from the NAND-gate 224 also is connected to a NAND-gate 228, used as an inverter, whose output is connected to one input to a NAND-gate 230. A lead 232 connected the other input to the NAND-gate 230 to the output from the NAND-gate 202.

The reset push-button 38 is shown as having normally closed switch contacts to ground and normally open contacts connected to a +5 volts DC source of electrical energy. A resistor R31 connects the normally open contacts to the junction formed between the normally closed contacts and the input to a NAND-gate 234 used as an inverter. Thus, the input to the NAND-gate 234 is ground potential when the push-button 38 is positioned as shown, and, upon depression of the push-button 38, the normally closed contacts open and the normally open contacts close to apply a positive, high logic-level voltage to the NAND-gate 234 input. The output of the NAND-gate 234 has a filter capacitor C15 connected between it and a +5 volts DC source and is connected by leads 236, 238, and 240 to the reset (R) terminal of a JK flip-flop 244. A lead 242 also connects the NAND-gate 234 output to the reset terminal of a second JK flip-flop 246. The J input to the flip-flop 246 is connected to the $\overline{Q}$ output of the flip-flop 244, and the Q output of the flip-flop 246 is connected to the J input to the flip-flop 244.

A NAND-gate 248 has one of its inputs connected to the output of the NAND-gate 200 and has its other input connected by a lead 250 to the output of the NAND-gate 222. The output of the NAND-gate 248 is connected to both inputs to a NAND-gate 252, used as an inverter and which has the logic-level voltage output signal E12 shown in FIG. 7. The signal E12, consists of pulses hereinafter referred to as normal logic pulses, one of which occurs for each of the "normal" sawtooth voltage signals E7 which occur each time a normal or negative slope to the cooling curve is detected.

The signal E12 is applied to one input to a NAND-gate 254 the output of which is connected by leads 256 and 258, respectively, to the clock inputs to the JK flip-flops 244 and 246.

The JK flip-flops 244 and 246 comprise a "count-to-two" circuit which requires that two normal logic pulses E12 occur, after the appearance of the liquidus temperature, before a solidus temperature can be detected. This is designed to prevent the recording of a false solidus temperature, which might occur if the count-to-two circuit were not present. The count-to-two circuit requires that there be two clock periods of negative slope in the cooling curve prior to the recording of a solidus temperature.

The output of the NAND-gate 222 also is connected to one input to a NAND-gate 260. The output of the NAND-gate 260 is connected to one input of a NAND-gate 262, the output of which forms the other input to the NAND-gate 260. The output of the NAND-gate 260 also forms one input to the NAND-gate 254. The logic-level voltage signal E3 appears as the output of the NAND-gate 262.

A NAND-gate 264 is connected to the output of the NAND-gate 222, is used as an inverter and has its output connected through a filter capacitor C16 to ground. A logic-level voltage signal E13, shown in FIG. 7, appears on this output. The signal E13 is a short-duration positive pulse which occurs when the cooling curve for the iron sample has neither a "normal" slope nor a "reverse" slope, that is, when the cooling curve slope is substantially zero as occurs at both the liquidus and solidus temperatures of the cooling curve. The positive pulse of the E13 waveform occurs when the voltage signal E10 is high and when both the normal and reverse signals E7 and E8 are at their low voltage levels.

The Q output of the JK flip-flop 244 is applied to both inputs to a NOR-gate 266 used as an inverter the output of which forms one input to a NAND-gate 268. The other input to the NAND-gate 268 is obtained as the output of a NAND-gate 270. The output of the NAND-gate 270 carries the output signal E11 and is the other input to the NAND-gate 268. The output of the NAND-gate 268 forms one input to the NAND-gate 270, and other input to NAND-gate 270 is obtained via the leads 238 and 236 connected to the output of the NAND-gate 234. Upon the occurrence of the first normal logic pulse, waveform E12, after the detection of the first pulse of the waveform E13 during the cooling of the iron sample, the voltage signal E11 changes from a high to a low voltage level and is applied to the input to the clock circuit 36, shown in FIG. 5, to energize the relay 144, to close the relay contacts 150 and to place the capacitor C11 in the timer 152 circuit to double the period of the square wave output of this timer. Thus, the clock circuit output signals E9 and E10 have a period which doubles after the count-to-two circuit has detected two normal pulses after the occurence of the liquidus temperature, which is signalled by the presence of the first pulse in the waveform E13 and by the change in signal E3 from a high to a low voltage level. The change in period of the clock output signals E9 and E10 is necessary because the cooling rate of the iron sample is considerably reduced following the occurrence of the liquidus temperature, and, in the absence of an increased clock period, the change in amplitude of the thermocouple output voltage E1 at the end of each hold of the track and hold circuit 22 might not be sufficient to produce a normal logic pulse E12.

The output of the NAND-gate 268 forms one input to a NAND-gate 274 the other input of which is the voltage signal E13. The output of the NAND-gate 274 forms one input to a NAND-gate 276 the output of which forms one input to a NAND-gate 278. The output of the NAND-gate 278 is connected to the other input of the NAND-gate 276 and this output carries the logic-level voltage output signal E4. The other input to the NAND-gate 278 is obtained as the output of the NAND-gate 280, used as an inverter, whose input is obtained as the output of a NAND-gate 282. One input to the NAND-gate 282 is the output of the NAND-gate 230 and its other input is obtained via leads 286 and 284 connected to the output of the NAND-gate 234.

Figure 6:
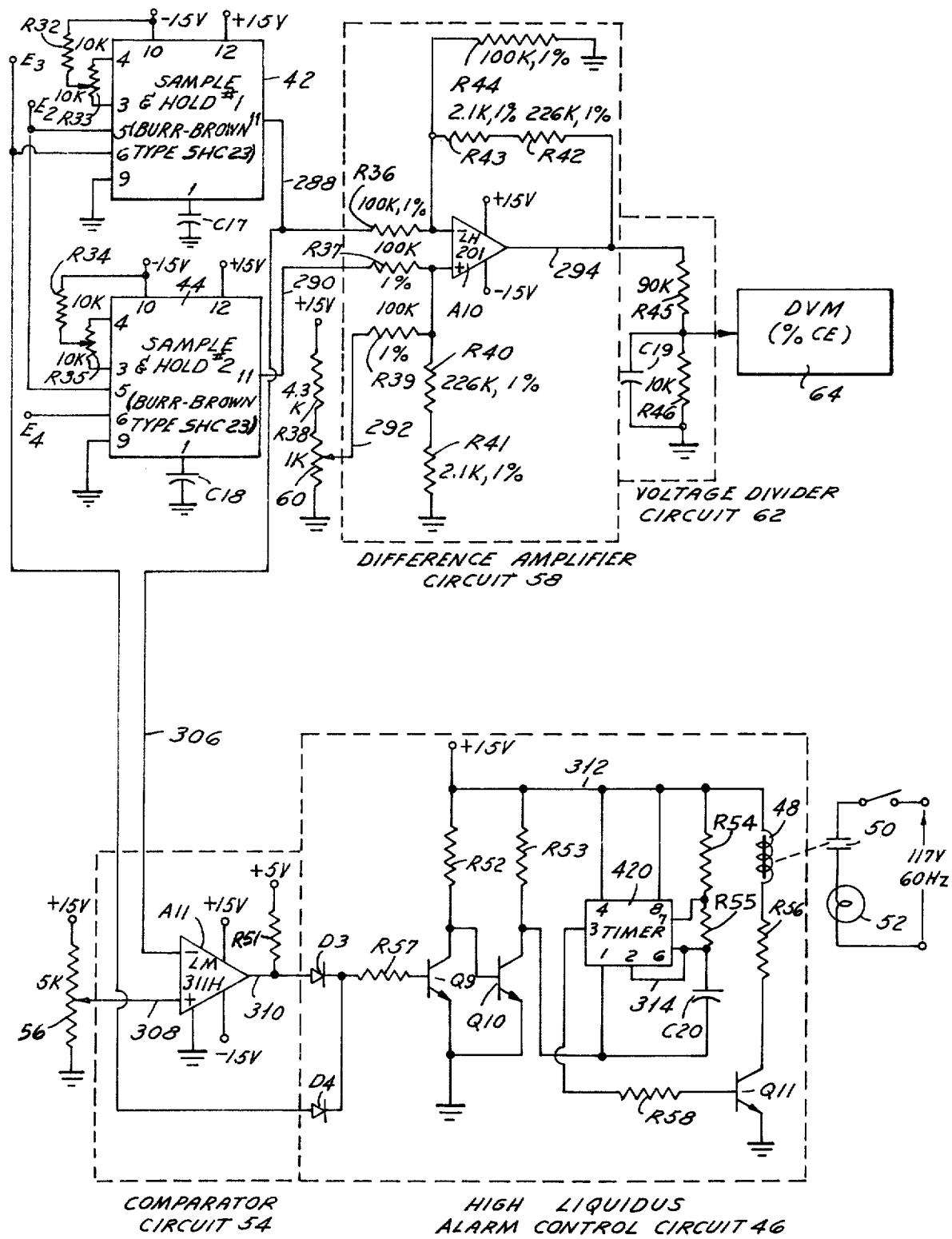
FIG. 6 is a schematic electrical diagram of the sample and hold number 1, sample and hold number 2, difference amplifier, voltage divider, comparator, and high-liquidus alarm control circuits shown in block form in FIG. 1.

With particular reference now to the sample and hold circuits 42 and 44, to the difference amplifier circuit 58, to the voltage divider circuit 62 and to the digital voltmeter 64 shown in FIG. 6, it may be seen that the first sample and hold circuit 42 is supplied with voltage signals E2 and E3. These signals, respectively, are applied to the pins 5 and 6 of a Burr-Brown type SHC23 sample and hold circuit. Pin 10 of this circuit is connected to a −15 volts DC and has a resistor R32 connected between it and the movable arm of a variable resistor R33. The variable resistor R33 is connected across pins 3 and 4 of this circuit. Pin 12 of the circuit is connected to +15 volts DC, pin 9 is connencted to ground, and pin 1 is connected through a low-leakage storage capacitor C17 to ground. The output of the circuit occurs at pin 11.

The second sample and hold circuit is identical in type to the first sample and hold circuit and is similarly connected. Thus, resistors R34 and R35 and a storage capacitor C18 are provided, and the voltage signal E2 is applied to the pin 5 of the second sample and hold circuit 44. However, pin 6 of the second sample and hold circuit is connected to the voltage signal E4. The sample and hold circuits 42 and 44 operate such that when the voltage signals applied to their pins 6 are high, the sample and hold circuit outputs 11 are at a voltage level corresponding to the signal applied to their inputs 5. Since the inputs 5 are connected to the voltage signal E2, which is obtained from the voltage divider 40 and which is proportional to thermocouple sensed temperature, the signals on pins 11 follow the voltage signal E2. However, when the voltage control signals on pins 6 of the sample and hold circuits become low voltage level signals, the output on their respective pins 11 assume and retain whatever value appears at their pin 5 inputs as of the instant the control signals on their pins 6 change from a high level to a low level.

The first sample and hold circuit 42 has its pin 11 output connected by a lead 288 to a resistor R36 connected to the negative input to an operational amplifier A10. Similarly, the pin 11 output of the second sample and hold circuit 44 is connected by a lead 290 and a resistor R37 to the positive input to the amplifier A10. A resistor R38 has one of its terminals connected to +15 volts DC and has its other terminal connected through the resistance of the potentiometer 60 to ground. The arm of the potentiometer is connected by a lead 292 and a resistor R39 to the positive input to the operational amplifier A10. Resistors R40 and R41 are connected between the amplifier positive input and ground potential. The output lead 294 of the amplifier A10 is connected by feedback resistors R42 and R43 to the negative input terminal to this amplifier. A resistor R44 is connected between the amplifier negative input and ground potential.

The first sample and hold circuit 42 is controlled by the voltage signal E3 produced by the sequence and logic control circuit 34. This signal changes from a high to a low voltage level upon the occurrence of the liquidus temperature, as is signified by the first "zero" logic signal pulse of signal E13, which occurs in the absence of both the normal and reverse signals of the waveforms E7 and E8. In other words, the absence of the normal and reverse signals signifies the occurrence of a substantially zero slope in the cooling curve and the sequence and logic control circuit 34 produces the pulse in the waveform E13 signifying the occurrence of the liquidus temperature in the iron sample. As a result, the voltage signal E3 goes from a high voltage level to a low voltage level causing the sample and hold circuit 42 to hold at its pin 11 output the value of the temperature signal E2 as of the instant the signal E3 changes from its high level to its low level. This output signal from the first sample and hold circuit 42 is supplied to the negative input to the operational amplifier A10.

The second sample and hold circuit 44 is controlled by the signal E4 applied to its pin 6. The sequence and logic control circuit 34 does not permit the voltage signal E4 to go from a high voltage level to a low voltage level until the count-to-two circuit, formed by JK flip-flops 244 and 246, has counted two normal logic pulses, waveform E12, after the occurrence of the liquidus temperature. After these two normal logic pulses have been counted, the first zero logic signal in waveform E13 to occur thereafter, that is, the pulse 414 in FIG. 7, causes the logic voltage signal E4 to go from its high voltage level to its low voltage level. This causes the magnitude of the temperature signal E2 at the input pin 5 of the second sample and hold circuit 44 to be retained on its pin 11 output. However, if there is a solidus undercool region in the cooling curve, such as the undercool region shown in FIG. 8, then a reverse sawtooth signal 412 occurs in the waveform E8, and the sequence and control logic circuit 34 causes the voltage signal E4 to go from its low voltage level back to its high voltage level. This signifies that a reverse or positive slope has occurred in the cooling curve and that the detected zero logic signal 414 was an undercool inflection in the cooling curve and not the solidus temperature. The next zero logic signal, 416 in FIG. 7, to occur after the reverse sawtooth signal 412, causes the voltage signal E4 once again to go from its high voltage level to its low voltage level. This again causes the value of the temperature voltage signal E2 at this instant to be retained on the pin 11 output of the second sample and hold circuit 44 and, at this point, the retained voltage value represents the true solidus temperature. The signal at pin 11, the solidus temperature signal, is applied to the positive input to the operational amplifier A10 and the constant value on the potentiometer 60 provides a voltage which is added to the solidus temperature voltage. The operational amplifier produces an output signal on its lead 294 which is proportional to the difference between this sum of voltages and the liquidus voltage signal on the amplifier negative input.

The output signal on the lead 294 from the amplifier is applied through a voltage divider consisting of series-connected resistors R45 and R46. A capacitor C19 is used to smooth the voltage which appears at the junction between these resistors. This voltage is, with proper scaling, directly indicative of the percent CE in the iron sample. The voltage signal at the junction is applied to a conventional digital voltmeter 64 which displays the percents CE as a numerical value.

With reference once again to FIG. 2, there is shown the schematic diagram of the measurement complete circuit 66. The circuit 66 includes a NAND-gate 296 having one of its inputs connected to the output of the NAND-gate 276, which output is at a high voltage level when the signal E4 is at a low voltage level. The other input to the NAND-gate 296 is connected via a lead 300 to the voltage signal E12 occurring at the output of the NAND-gate 252. Since the voltage signal E12 consists of the normal logic pulses, which occur during the normal negative slope cooling of the iron sample, and since the first input to the NAND-gate 296 is the complement of the voltage signal E4, the output of the NAND-gate 296 goes to a low voltage level upon the occurrence of the first normal logic pulse (designated by the numeral 418 in FIG. 7) to occur after the voltage signal E4 has gone from a high to its low voltage level.

The output of the NAND-gate 296 is applied to a flip-flop circuit consisting of NAND-gates 302 and 304 interconnected as shown. One input to the NAND-gate 304 is connected to the output of the NAND-gate 234 to permit the flip-flop to be reset by the depression of the push-button switch 38. The output of the NAND-gate 302 is connected through a resistor R47 to the base of a transistor Q7. The emitter of the transistor Q7 is connected to ground and the collector of this transistor is connected through series-connected resistors R48 and R49 to a +15 volts DC. A resistor R50 is connected to this voltage supply and in series with the relay coil 68 which controls the relay contacts 70. The relay coil 68 is connected to the emitter of the transistor Q8 whose collector is connected to ground. The base of the transistor Q8 is connected to the junction formed between the resistors R48 and R49. Upon the occurrence of the low level signal at the output of the NAND-gate 296, the NAND-gate 302 produces a high voltage level signal at its output which is applied to the base of the transistor Q7 rendering it conductive in its output circuit. This reduces the voltage at the junction formed between the resistors R48 and R49, and this reduced voltage is applied to the base of the PNP transistor Q8 to render it conductive. This energizes the relay coil 68, closes the contacts 70 and results in energization of the indicating lamp 72. The indicating lamp 72 indicates that the percent CE computation performed by the computer has been completed and the numerical value displayed by the digital voltmeter 64 is the percent CE of the iron sample.

During actual use of the cooling curve computer, molten cast iron may be poured to manufacture parts immediately after the iron sample is poured to determine its percent CE. In such case, it is desirable to have an indication of a high liquidus temperature as soon as possible after the iron sample is poured because a high liquidus temperature indicates the iron sample has a low percent CE. This inidicates that the cast iron is hard and brittle and will be difficult to machine and, therefore, it may be desirable to immediately cease casting the parts.

The function of the circuitry comprising the comparator circuit 54 and the high liquidus alarm control 46 in FIG. 6 is to provide an alarm signal in the event a high liquidus temperature is detected. The comparator circuit 54 includes a comparator All which has an output lead 310 on which a high voltage level signal appears if the positive input 308 to the comparator is larger in magnitude than the signal on its negative input. The positive input to the comparator All is connected to the arm of the potentiometer 56 and thus has a fixed voltage on it. Its negative input is connected by a lead 306 to the output pin 11 of the first sample and hold circuit 42. The high voltage at the output lead 310 is supplied by a +5 volt DC source of electrical energy connected through a pull-up resistor R51 to the output lead 310. A diode D3 has its anode connected to the output lead 310 and has its cathode connected through a current limiting resistor R57 to the base of a transistor Q9. The emitter of the transistor Q9 is connected to ground and its collector is connected through a current limiting resistor R52 to a +15 volt DC source of electrical energy. Voltage supply lead 312 connects this voltage source through a resistor R53 to the collector of a transistor Q10. The base of the transistor Q10 is connected to the collector of the transistor Q9. The emitter of the transistor Q10 is connected to ground and its collector is connected to pin 1 of a timer 420. The timer as shown has the pin connections of a Signetics Corporation type NE555 timer circuit. A lead 314 connects pin 2 of this timer to its pin 6 and a capacitor C20 is connected between its pins 1 and 6. A resistor R55 is connected between its pins 6 and 7 and a resistor R54 couples its pin 7 to the voltage supply lead 312. Pins 4 and 8 of the timer are connected to the voltage supply lead 312. The output of the timer occurs on its pin 3 and is a square wave signal which occurs only when the timer pin 1 is connected by conduction of the output circuit of the transistor Q10 to ground potential. The period of the square wave is determined by the values of resistors R54 and R55 and capacitor C20. The output pin 3 is connected through a resistor R58 to the base of a transistor Q11 whose emitter is connected to ground. The collector of the transistor Q11 is connected through a resistor R56 and the relay coil 48 to the voltage supply lead 312. The relay coil 48 controls the contacts 50 connected in series with the indicating lamp 52.

If the liquidus temperature has not as yet occurred, then the logic-level voltage signal E3 is supplied through a diode D4 and the resistor R57 to the base of the transistor Q9. This voltage signal E3 is at a high level prior to the occurrence of the liquidus temperature and causes the transistor Q9 to be conductive in its collector-emitter output circuit. Upon occurrence of the liquidus temperature, the voltage signal E3 becomes a low level signal and the diode D4 does not conduct. However, if a low liquidus temperature exists at the output pin 11 of the first sample and hold circuit 42, then the output of the comparator All is a high voltage level and current flows through the diode D3 to the base of the transistor Q9 maintaining its output circuit conductive. However, if a high liquidus temperature exists to produce a voltage signal on the pin 11 of the first sample and hold circuit 42 which is in excess of the voltage set on the the lead 308 connected to the arm of the potentiometer 56, then the negative input to the comparator All has a greater voltage than that on its positive input and the comparator output signal is a low voltage level. In such case, neither the diode D3 nor the diode D4 is conductive to supply the base drive for the transistor Q9 and this transistor is nonconductive in its output circuit. The nonconductive state of the transistor Q9 renders the transistor Q10 conductive and connects pin 1 of the timer 420 to substantially ground potential. As a result, an oscillatory or square wave voltage occurs on pin 3 of the timer to alternately turn the transistor Q11 on and off in a corresponding oscillatory manner. This repetitively energizes and de-energizes the relay coil 48. As a result, the relay contacts 50 are closed and opened in an alternating manner and the indicating lamp 52 is energized and de-energized repetitively producing a flashing-light indication that a high liquidus temperature has occurred.

The operation of the cooling curve computer 10 may be easily understood by reference to FIG. 1, 7 and 8. In FIG. 7, the time to corresponds to the depression of the reset push-button 38, which resets the logic circuitry, and the pouring of the iron sample into a mold wherein the thermocouple 12 is located to sense its cooling curve. The clock circuit 36 generates the waveforms E10 and E9. These waveforms divide the cooling curve into a plurality of periods. At the end of each period, the pulses E10 are generated which cause the sequence and logic control circuit to act upon signals E7 and E8. If the iron sample is cooling normally with a negative slope of sufficient magnitude, the signal E7 is high and a normal logic pulse occurs in the waveform E12. On the other hand, if the slope of the cooling curve is substantially zero, then there is an absence of a normal logic pulse in the waveform E12 and the signal E7 is low. This signals the occurrence of the liquidus temperature and the magnitude of the signal E2, proportional to the iron sample temperature, is stored in the first sample and hold circuit 42.

After the liquidus temperature is detected as described in the preceding paragraph, the iron sample continues to cool and the normal logic pulses of the waveform E12 are produced. After two of these normal logic pulses have occurred subsequent to the detection of the liquidus temperature, the signal E11 changes from a high voltage level to a low voltage level to cause the period of the signals E9 and E10, to double. This accommodates the slower cooling rate of the iron sample after the liquidus temperature has been reached.

After the period of the signals E9 and E10 has changed, the computer continues to look for a zero slope to the cooling curve at each occurrence of the pulses in the waveform E10. If a zero slope is detected, the magnitude of the temperature signal E2 as of such instant is stored in the hold mode of the second sample and hold circuit 44. If cooling of the iron sample thereafter continues in a normal manner with a negative slope, then a normal logic pulse occurs in the waveform E12 and the measurement complete circuit 66 energizes the indicating lamp 72 to indicate completion of the calculation of the percent CE. On the other hand, if after the last mentioned zero slope is detected to indicate a solidus temperature and a reverse or positive slope to the cooling curve is detected in the voltage signal E8, then the second sample and hold circuit 44 is caused by the reverse signal or sawtooth pulse, 412 in FIG. 7, to again follow the E2 temperature signal until a subsequent zero slope in the cooling curve is detected, at which point the true solidus temperature will have been detected and the corresponding magnitude of the signal E2 stored at the output of the second sample and hold circuit 44. The first normal logic pulse to occur subsequent to this causes the indicating lamp 72 to be illuminated indicating completion of the percent CE measurement.

In the sequence and control logic circuit 34, the NAND-gates 192, 194, 196 and 198 have the function of preventing a false liquidus indication to be stored in the first sample and hold circuit 42. This false liquidus signal might otherwise occur if the iron sample initially had a very high temperature. This would cause the thermocouple amplifier circuit 18 to saturate and thereafter not change in its output value for a period of time. No change in the output of the thermocouple amplifier would signify a constant slope to the cooling curve, but the presence of the specified NAND-gates requires that a normal or negative slope to the cooling curve occur prior to the registration in the computer circuitry of the liquidus temperature.

Additional circuitry, substantially identical to the circuitry used to detect the solidus temperature and store a voltage signal proportional to it, may be used to detect the eutectoid temperature indicated in FIG. 8. An operational amplifier may be used to compute the percent silicon, using the equation therefor previously given, and another operational amplifier may be used to calculate the percent carbon, this being equal to the percent CE minus one-third the percent Si.

Based upon the foregoing description, what is claimed is:

1. A cooling curve computer for detecting first and second temperatures at which changes occur in the slope characteristic of the cooling curve of a metal alloy sample, said cooling curve computer comprising:

means for generating a first electrical signal proportional to the temperature of said sample;

first circuit means, supplied with said first electrical signal, for detecting said first temperature and said second temperature of said sample, said first electrical signal at said first temperature being characterized by a decrease in the magnitude of the slope of said cooling curve and by the absence of a reversal in the slope thereof and said first electrical signal at said second temperature being characterized by a change in the magnitude of the slope of the said cooling curve with or without a reversal in said slope;

second circuit means for storing signals representative of the magnitudes of said first electrical signal at the times of occurrence of said first and second temperatures; and third circuit means for generating a second electrical signal having a magnitude mathematically related to the magnitude of said first electrical signal as represented by said signals stored by said second circuit means, said third circuit means utilized said stored signals in the generation of said second electrical signal.

2. A cooling curve computer for detecting the liquidus and solidus temperatures of a poured sample of iron alloy or other metal alloy and for computing the percentage or equivalent percentage of one or more constituents of said samples from electrical signals representative of the magnitudes of said liquidus and solidus temperatures, said cooling curve computer comprising:

means for generating a first electrical signal proportional to the temperature of said sample;

first circuit means, supplied with said first electrical signal or a signal proportional to it, for detecting the liquidus and solidus temperatures of said sample;

second circuit means for storing the magnitudes of said first electrical signal at the times of occurrence of said liquidus and said solidus temperatures; and third circuit means for generating a second electrical signal representative of the percentage or equivalent percentage of a constituent of said sample, said third circuit means utilizing said stored magnitudes of said first electrical signal in the generation of said second electrical signal.

3. A cooling curve computer according to claim 2 wherein said second circuit means includes: circuit means for generating an electrical signal periodically which signal is proportional to the slope of the cooling curve of said sample; and circuit means, supplied with said electrical signal proportional to the slope of said cooling curve, for causing the magnitudes of said first electrical signal to be stored when the slope of said cooling curve is substantially zero.

4. A cooling curve computer according to claim 3 wherein said circuit means further includes means for detecting an inflection point in the cooling curve of said sample and for preventing the magnitude of said first electrical signal, at the time of occurrence of said inflection point, from being retained in storage, whereby, the magnitude of said first electrical signal at a subsequent substantially zero slope of said cooling curve may be stored.

5. A cooling curve computer according to claim 2 wherein said first circuit means includes: a clock circuit for generating a periodic control signal; a track and hold circuit supplied with said first electrical signal, or, a signal proportional to it, and controlled by said periodic clock signal, said track and hold circuit having an output signal which follows said first or proportional electrical signal for a first portion of said periodic control signal and which holds the value of said first or proportional electrical signal for a second portion of said periodic control signal; a differential amplifier supplied with said first electrical signal, or, a signal proportional to it, and supplied with said output signal of said track and hold circuit to produce an electrical output signal proportional to the difference between said signals supplied to said differential amplifier; circuit means for determining if the magnitude of said output signal of said differential amplifier is within predetermined limits; and circuit means for storing the magnitudes of said first electrical signal when the output signal from said differential amplifier is within said predetermined limits.

6. A cooling curve computer according to claim 5 wherein said circuit means for determining whether the magnitude of said output signal of said differential amplifier is within said predetermined limits includes circuit means for determining if the slope of said cooling curve is negative and of a magnitude above a first predetermined value, circuit means for determining if the slope of said cooling curve is positive and of a magnitude above a second predetermined value, and circuit means for causing the magnitude of said first electrical signal to be stored if said output signal from said differential amplifier is between said first and second predetermined values.

7. A cooling curve computer for determining the liquidus and solidus temperatures of a cooling sample of a metal alloy, said cooling curve computer comprising:

means for sensing the temperature of said sample and for generating a first electrical signal proportional to the temperature of said sample;

a clock circuit for generating a periodic second electrical signal;

a track and hold circuit, controlled by said clock circuit and supplied with said first electrical signal, for following said first electrical signal for a portion of said periodic second electrical signal and for holding the magnitude of said first electrical signal for a second portion of said periodic second electrical signal;

a differential amplifier, supplied with said first electrical signal and coupled to said track and hold circuit, for generating a third electrical signal having a magnitude proportional to the difference between the magnitude of the signal held by said track and hold circuit during the second portion of said periodic electrical signal and the magnitude of said first electrical signal;

first and second detector amplifiers, coupled to said differential amplifier and supplied with said third electrical signal, for determining if said third electrical signal is of a magnitude within predetermined limits;

a sequence and control logic circuit, coupled to said first and second detector amplifiers and responsive thereto, for generating a fourth electrical signal upon the first occurrence of a magnitude of said third electrical signal within said predetermined limits and for generating a fifth electrical signal upon a subsequent occurrence of a magnitude of said third electrical signal within said predetermined limits;

a first sample and hold circuit responsive to said fourth electrical signal for sampling and holding the magnitude of said first electrical signal or a signal proportional thereto upon the occurrence of said fourth electrical signal;

a second sample and hold circuit for sampling and holding the magnitude of said first electrical signal or a signal proportional thereto upon the occurrence of said fifth electrical signal; and circuit means, coupled to said first and second sample and hold circuits, for generating a sixth electrical signal having a magnitude determined by the magnitudes of the electrical signals held by said first and second sample and hold circuits.

8. A cooling curve computer according to claim 7 which further includes circuit means for generating an alarm signal if the magnitude of said first electrical signal upon occurrence of said fourth electrical signal is greater than a predetermined value.

9. A process for determining the percentage or equivalent percentage of one or more constituents of a sample of cooling metal alloy, said process comprising the steps of:

generating a first electrical signal proportional to the temperature of said sample;

generating a second electrical signal periodically during the cooling of said sample, said second electrical signal at at least one point during each of its periods having a magnitude proportional to the change in temperature of said cooling sample during such period;

with electronic circuitry, determining the first occurrence of a magnitude of said second electrical signal within predetermined magnitude limits and generating a third electrical signal upon such first occurrence of said second electrical signal within such predetermined limits;

storing the magnitude of said first electrical signal or a signal proportional thereto upon the occurrence of said third electrical signal;

generating a fourth electrical signal upon a subsequent occurrence of a magnitude of said second electrical signal within predetermined limits;

storing the magnitude of said first electrical signal or a signal proportional thereto upon the occurrence of said fourth electrical signal; and utilizing said stored magnitudes of said first electrical signal, or signal proportional thereto, generating a fifth electrical signal representative of the percentage or equivalent percentage of a constituent of said cooling sample.

10. A cooling curve computer for detecting first, second and third temperatures at which changes occur in the slope characteristic of the cooling curve of a metal alloy sample, said cooling curve computer comprising:

means for generating a first electrical signal proportional to the temperature of said sample;

first circuit means, supplied with said first electrical signal, for detecting said first temperature, said second temperature and said third temperature of said sample;

second circuit means for storing signals representative of the magnitudes of said first electrical signal at the times of occurrence of said first, second and third temperatures;

and third circuit means for generating a second electrical signal having a magnitude mathematically related to the magnitudes of said first electrical signal as represented by said signals stored by said second circuit means, said third circuit means utilizing at least two of said stored signals in the generation of said second electrical signal.

11. A cooling curve computer for detecting the liquidus, solidus and eutectoid temperatures of a poured sample of iron alloy or other metal alloy and for computing the percentage or equivalent percentage of one or more constituents of said sample from electrical signals representative of the magnitude of said liquidus, solidus and eutectoid temperatures, said cooling curve computer comprising:

means for generating a first electrical signal proportional to the temperature of said poured metal alloy sample;

first circuit means, supplied with said first electrical signal or a signal proportional to it, for detecting the liquidus, solidus and eutectoid temperatures of said sample;

second circuit means for storing the magnitude of said first electrical signal at the times of occurrence of said liquidus, solidus and eutectoid temperatures; and third circuit means for generating a second electrical signal representative of the percentage or equivalent percentage of a constituent of said sample, said third circuit means utilizing said stored magnitudes of said first electrical signal in the generation of said second electrical signal.

* * * * *